United States Patent [19]

Roth

[11] Patent Number: 5,709,273

[45] Date of Patent: Jan. 20, 1998

[54] AERATOR

[76] Inventor: Binson L. Roth, 921 Flora La., Boothwyn, Pa. 19061

[21] Appl. No.: 637,540

[22] Filed: Apr. 25, 1996

[51] Int. Cl.$^6$ .................................................. A01B 45/02
[52] U.S. Cl. ........................................ 172/22; 172/371
[58] Field of Search ............................ 172/22, 21, 19, 172/371

[56] References Cited

U.S. PATENT DOCUMENTS

| | | |
|---|---|---|
| 1,965,177 | 7/1934 | Finkl . |
| 2,020,571 | 11/1935 | Pick . |
| 2,140,266 | 12/1938 | Leeberg . |
| 2,210,440 | 8/1940 | Avary .................. 172/22 X |
| 2,612,725 | 10/1952 | Casey .................. 172/22 X |
| 2,800,066 | 7/1957 | Cohrs et al. ............ 172/22 |
| 2,881,844 | 4/1959 | Miller ................... 172/22 |
| 3,011,563 | 12/1961 | Ceretti et al. .......... 172/22 |
| 3,113,534 | 12/1963 | Wessel ................ 172/22 X |
| 3,163,456 | 12/1964 | Schell, Jr. et al. . |
| 3,210,112 | 10/1965 | Glynn . |
| 3,264,877 | 8/1966 | Boxrud ................ 172/22 X |
| 3,429,378 | 2/1969 | Mascaro ............... 172/22 |
| 3,865,055 | 2/1975 | Gilbaugh ............. 172/22 X |
| 3,881,553 | 5/1975 | Angeski ............... 172/22 |
| 3,927,720 | 12/1975 | Rauch ................. 172/22 |
| 4,081,034 | 3/1978 | Hines .................. 172/22 |
| 4,192,387 | 3/1980 | Stinson ................ 172/21 |
| 4,476,938 | 10/1984 | McKay ................ 172/22 |
| 4,556,114 | 12/1985 | Ryan ................. 172/22 X |
| 4,574,890 | 3/1986 | Hansen et al. ......... 172/22 |
| 4,607,704 | 8/1986 | Kepes ................ 172/21 X |
| 4,638,867 | 1/1987 | Hansen et al. ......... 172/22 |
| 4,662,456 | 5/1987 | Classen ............... 172/22 |
| 4,791,995 | 12/1988 | Hochlam, Jr. .......... 172/21 |
| 4,881,602 | 11/1989 | Hansen et al. ......... 172/22 |
| 5,535,833 | 7/1996 | Matthews ............ 172/22 X |

FOREIGN PATENT DOCUMENTS

| | | | |
|---|---|---|---|
| 531285 | 9/1954 | Belgium ................ 172/22 |
| 270205 | 5/1927 | United Kingdom ...... 172/22 |
| 481810 | 3/1938 | United Kingdom . |
| 2189371 | 10/1987 | United Kingdom ...... 172/22 |

Primary Examiner—Terry Lee Melius
Assistant Examiner—Christopher J. Novosad
Attorney, Agent, or Firm—Connolly and Hutz

[57] ABSTRACT

A hand-held aerator useful for removing soil to facilitate the passage of water, air, and nutrients is disclosed.

37 Claims, 4 Drawing Sheets

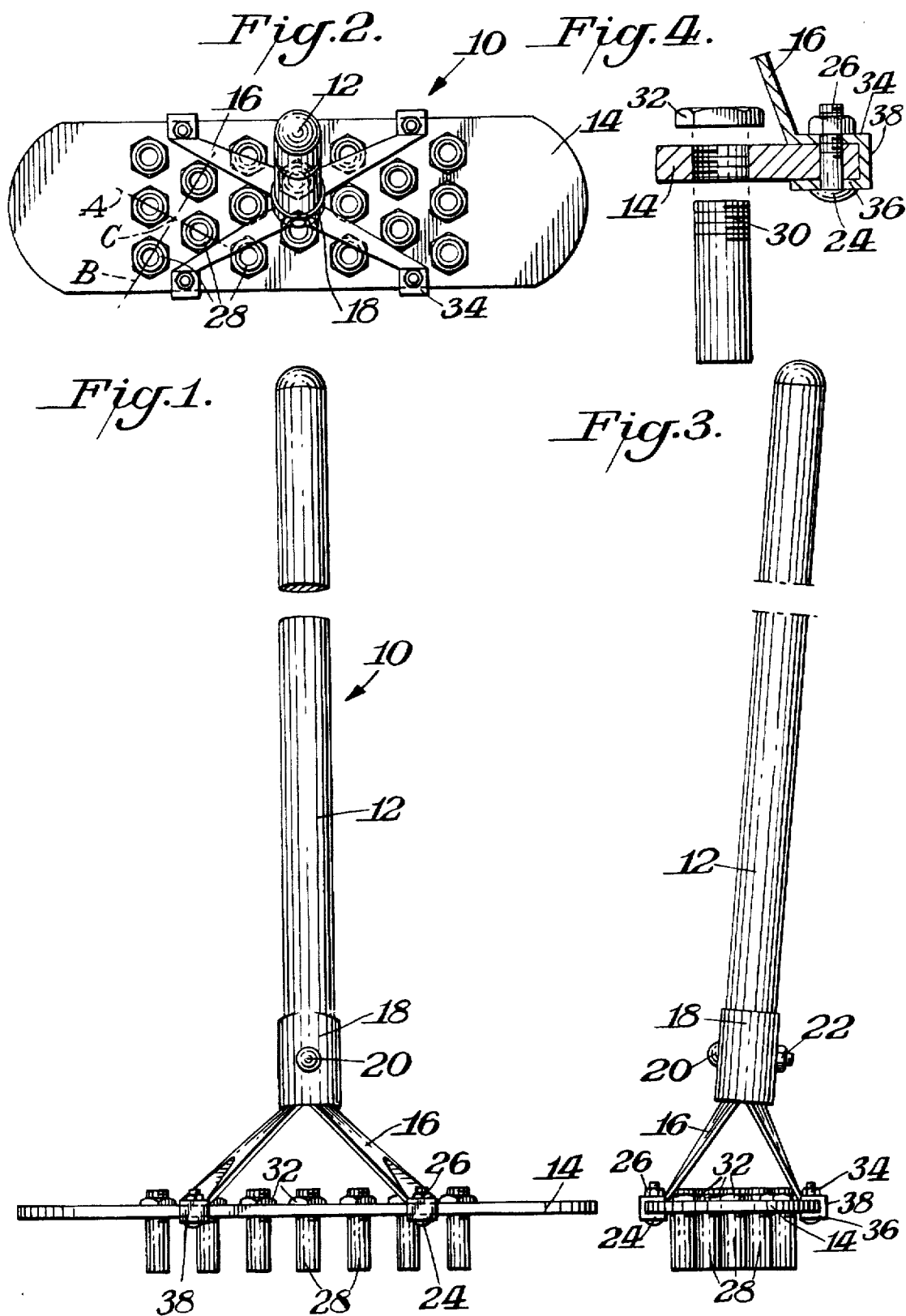

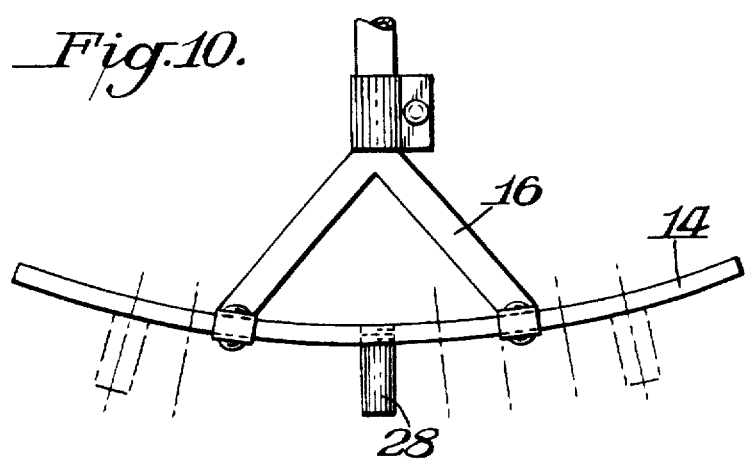
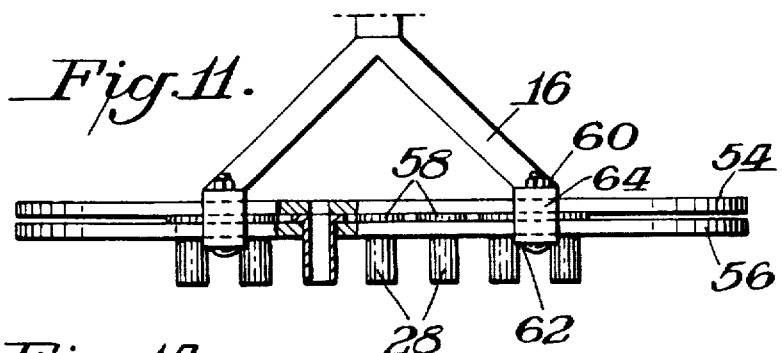
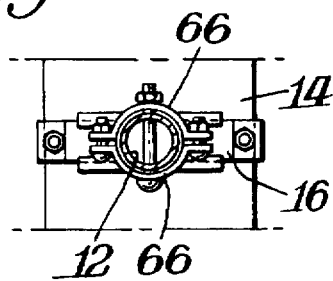
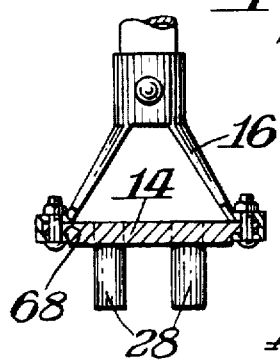
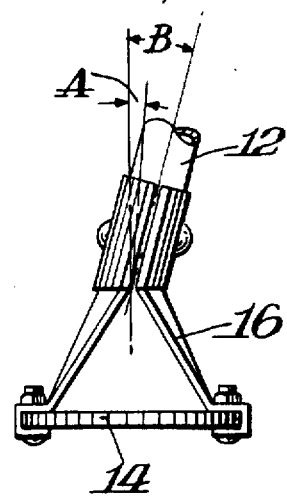
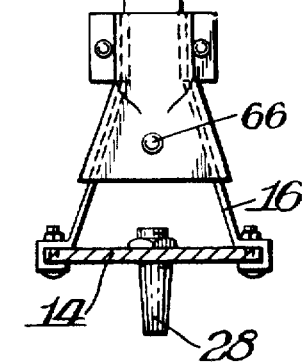

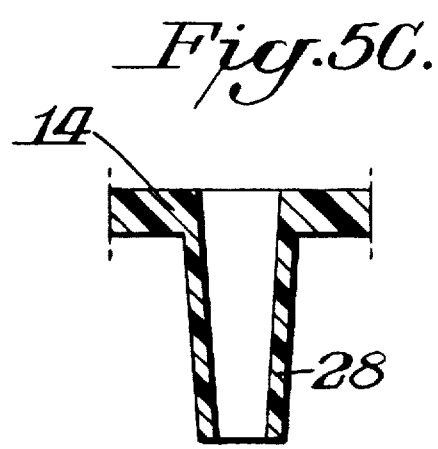

5,709,273

1

AERATOR

BACKGROUND OF THE INVENTION

A variety of aerating devices have been developed for forming slots or holes in the earth to facilitate the passage of water, air, and nutrients into the soil. Early devices used prongs or nails to pierce the earth. Pick et al., U.S. Pat. No. 2,020,571 is one such device. Later devices used hollow tines to pierce the earth. Leeberg, U.S. Pat. No. 2,140,266 is one such device.

In operation, devices such as the Leeberg device are manually pressed into the ground, thereby forcing earth into the interior of the tines. The device is then removed from the ground and inserted into the ground at a different location. While the device is being inserted again, the earth in the tines from the previous insertion is forced upward and deposited into a holding tray by the earth currently being penetrated by the tines.

Aerators of this type suffer from a number of drawbacks. In use, the tines may strike stones or other impenetrable objects which causes breaking or deformation. As a result, the tines have to be replaced frequently. In addition, the tines of these devices have difficulty retaining earth when the device is being removed from the ground. Soil that is removed oftentimes falls back into the hole created by the tines, thereby lessening the effectiveness of the aerator. Furthermore, these devices have handles connected to a tine-holder assembly. These connections have proven unsatisfactory due to their inability to be removed or replaced easily and due to their expense.

Through the years, a variety of differently shaped tines as well as methods of holding the tines in the tine-holder assembly have been tried. Hansen et. al., U.S. Pat. No. 4,881,602 show different tine shapes employed in the prior art. Hansen et. al., U.S. Pat. No. 4,574,890 and Hansen et. al., U.S. Pat. No. 4,638,867 show various tine-holder assemblies. These attempts have proven unsatisfactory due to their lack of versatility in use.

The object of the invention is to provide a new and improved aerator that provides tines that have improved performance in holding earth during removal. Another object of this invention is to provide an aerator that is versatile, easy to use and that provides for durable tines that are easily replaced when broken or deformed. Another object of the invention is to provide a method of connecting the handle and the tine-holder assembly that demonstrates improved functioning during use at reduced expense.

BRIEF SUMMARY OF THE INVENTION

These objects are accomplished by an aerator which comprises a base plate with an upper and lower surface, a handle spaced apart from the base plate, a bracket connected to the handle and connected to the base plate with a first portion of the bracket contacting the upper surface of the base plate and a second portion of the bracket contacting the lower surface of the base plate, and a plurality of hollow tines of generally circular cross section in at least one row attached to the base plate wherein each tine has an earth-piercing end and a discharge end such that the earth-piercing end is downwardly directed from the base plate and the discharge end is opposite the downwardly directed earth-piercing end and discharges earth on the upper surface of the base plate.

The base plate of the present invention may be composed of metal, wood, plastic or thermoplastic resin material or any other suitable material. Preferred are plastic, thermoplastic resin material or metal. Particularly preferred is metal. The base plate may be flat or arcuate.

The tines are of generally circular cross section and are attached to the base plate in spaced-apart relation wherein each tine has an earth-piercing end and a discharge end such that the earth-piercing end is downwardly directed from the base plate and the discharge end is opposite the downwardly directed earth-piercing end and discharges earth on the upper surface of the base plate. The tines may be attached to the base plate in at least one of row or in a plurality of rows. In addition, the tines of one row may be spaced apart and offset from the tines in an adjacent row. The tines may be offset such that the center point of each tine in a row is adjacent to a point that bisects the centerpoints of two adjacent tines. In a preferred embodiment, there are five rows of tines.

The tines of the present invention preferably have an inwardly directed annular projection disposed on an interior surface of each tine. Preferably, the inwardly directed annular projection is disposed on an interior surface of each tine near the earth-piercing end of the tine.

The handle of the present invention can be composed of wood, metal, plastic or thermoplastic resin material or any other suitable material. The handle is connected to the base plate at an angle measured from the vertical at a range of between 0° and about 15°. Preferably, the handle is at an angle of about 7° from the vertical.

The handle and the bracket may be integrally formed at one end of the handle. The handle and the bracket may also be connected by a collar, opposing clamp plates, screws, rivets, or any other suitable connecting device.

The handle may be connected to the base plate by a second bracket having a first portion contacting the upper surface of the base plate and a second portion contacting the lower surface of the base plate and wherein said bracket and said second bracket are disposed radially from one end of the handle. Preferably the handle is connected to the base plate with the first portion of the bracket contacting the upper surface of the base plate and a second portion of the bracket contacting the lower surface of the base plate.

In a preferred embodiment, the base plate has a groove in the lower surface of the base plate so that the second portion of the bracket contacts the base plate in the groove.

The tines may be connected to the base plate in any suitable manner. Preferably, the tines are connected to the base plate by an adhesive or heat fusing. Particularly preferred is where the tines have screw threads on an outer surface of the tines and the tines are screwed into the base plate. The tines may have screw threads formed on an outer surface of the tines and mating screw threads are formed in openings in the base plate and wherein each tine is threaded into one opening, optionally being held in place with a lock nut. The tines may be welded to the base plate. The tines may also be press-fit into openings formed in the base plate. In another embodiment, the tines and base plate are molded together into a one-piece unit.

The aerator of the present invention may also have a first base plate with an upper and a lower surface and a second base plate with an upper and a lower surface wherein said second base plate is spaced apart from said first base plate, a handle spaced apart from the first base plate, a bracket connected to the handle and connected to the first and second base plates with a first portion of the bracket contacting the upper surface of the first base plate and a second portion of the bracket contacting the lower surface of the second base plate, and a plurality of hollow tines of generally circular cross section contacting the second base plate, wherein each tine has an earth-piercing end and a discharge end such that the earth-piercing end is downwardly directed from the second base plate and the discharge end is opposite the downwardly directed earth-piercing end and terminates adjacent to the upper surface of the second base plate. Preferably, a flange projects from an outer surface of each tine and said flange contacts the lower surface of the first base plate and the upper surface of the second base plate. Thus, the tines may be placed in the lower base plate and held in place by the upper base plate. Also preferred is a bolt connector which fastens together the first portion of the bracket, the first base plate, the second base plate and the second portion of the bracket to retain the flanges projecting from the tines between the first base plate and the second base plate. Preferably, the discharge ends of the tines terminate adjacent to the lower surface of the first base plate.

BRIEF DESCRIPTION OF THE DRAWINGS

FIG. 1 is a front elevation view of the aerator.

FIG. 2 is a top plan view of the aerator showing a plurality of tines in a plurality of rows in a preferred arrangement of the tines.

FIG. 3 is a side elevation view of the aerator.

FIG. 3A is a side elevation view of a portion of the aerator showing the handle at an angle from the vertical.

FIG. 4 is a cross sectional view of a tine, the base plate and the bracket connection to the base plate.

FIG. 5C is a cross-sectional view of a tine wherein the base plate and the tine are molded together.

FIG. 10 is a front elevation view of the aerator wherein the base plate is arcuate.

FIG. 11 is a front elevation view of the aerator with upper and lower base plates.

FIG. 12 shows a tine with a flange at the earth-discharging end.

FIG. 13 is a side elevation view of a bracket assembly having opposing clamp plates.

FIG. 14 is a top view of the bracket assembly of FIG. 13.

FIG. 15 is a side elevation view of a base plate having groove on the lower surface of the base plate.

DESCRIPTION OF THE DRAWINGS

Figure 6:
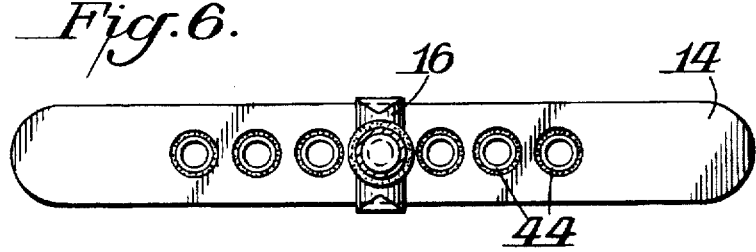
FIG. 6 is a top plan view of the base plate with a plurality of tines in a single row.

Referring to FIGS. 1–4, an aerator (10) is shown which comprises a handle (12) and a base plate (14). The handle is connected to the base plate by brackets (16). In one embodiment, brackets (16) are connected to the handle (12) by a collar (18) that is connected to the handle (12) by a bolt (20) and a nut (22). The brackets (16) contact the base plate (14) on both the upper and lower sides of the base plate and are connected to the base plate by a bolt (24) and a nut (26). The tines (28) have a generally circular cross section and, in one embodiment, are threaded (30) so that they are screwed into the base plate (14) and secured by a nut (32).

In a preferred embodiment, as shown in FIG. 2, the tines are offset from each other so that center line A and center B intersect at point C which bisects center line A and center line B.

As shown in FIG. 3A, the handle (12) may be at an angle from the vertical.

As shown in FIG. 4, the bracket (16) is arranged so that a depending portion of the bracket (34) contacts the upper side of the base plate (14) and a further depending portion of the bracket (36) contacts the lower side of the base plate and the depending portions are separated by a lip (38) that covers a portion of the side of the base plate. A bolt (24) passes through the portion (36) contacting the lower side of the base plate, passes through the base plate (14), and passes through the portion (34) contacting the upper side of the plate. The bolt (24) is secured by a nut (26).

Figure 5:
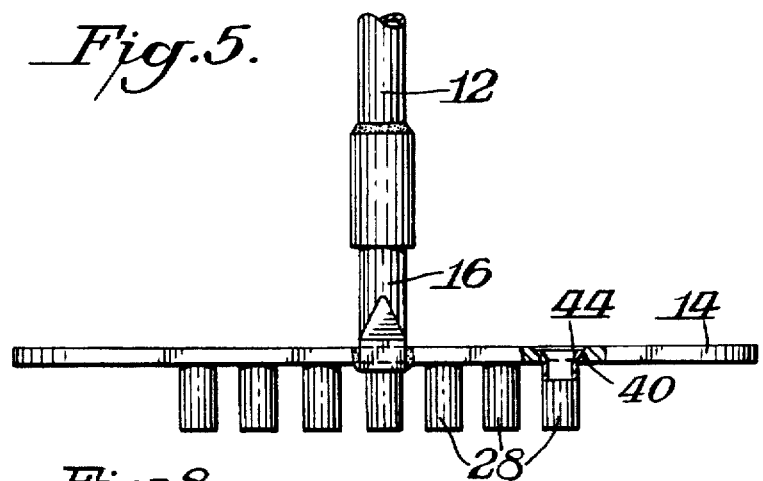
FIG. 5 is a front elevation view of the aerator with a tine flared at the earth discharging end.
Figure 5A:
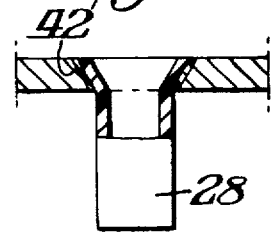
FIG. 5A is a partial cross sectional view of a tine with a flared earth discharging end connected to the base plate by heat fusing or adhesive.

As shown in FIG. 5, the tines (28) may be flared at the earth-discharging end (40). The tines (28) may be attached to the base plate (14) by an adhesive (42) (see FIG. 5A) or a weld (44) (see FIG. 5). The tines (28) may also have an inwardly directed annular projection (46) that is located near the earth-piercing end of the tine. This projection retards the tendency of earth material to discharge from the earth piercing end of the tine.

Figure 9:
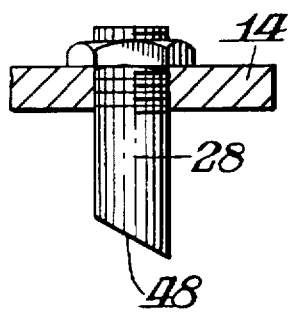
FIG. 9 is a side elevation view of a tine assembly wherein the earth piercing end of the tine is angled.
Figure 8:
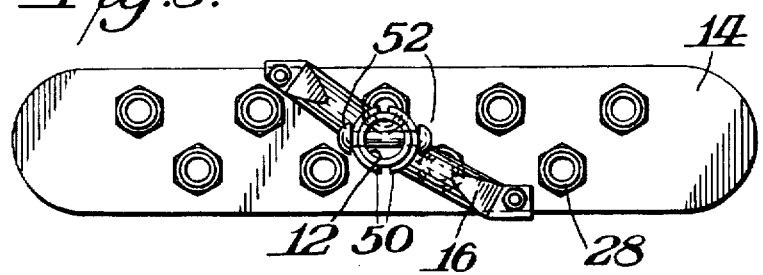
FIG. 8 is a top plan view of the aerator with two rows of offset tines.
Figure 5B:
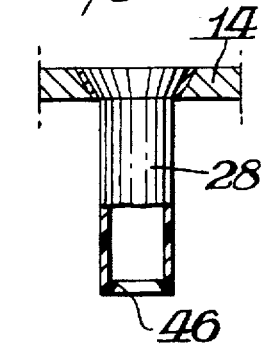
FIG. 5B is a cross sectional view of the earth piercing end of a tine with an annular projection in the interior of a tine.

As shown in FIG. 6, the tines may be in one row. Alternatively, as shown in FIG. 8, the tines may be in more than one row and offset from one another. As shown in FIG. 9, the tines (28) may have taper (48) at the earth-piercing ends of the tines.

Figure 7:
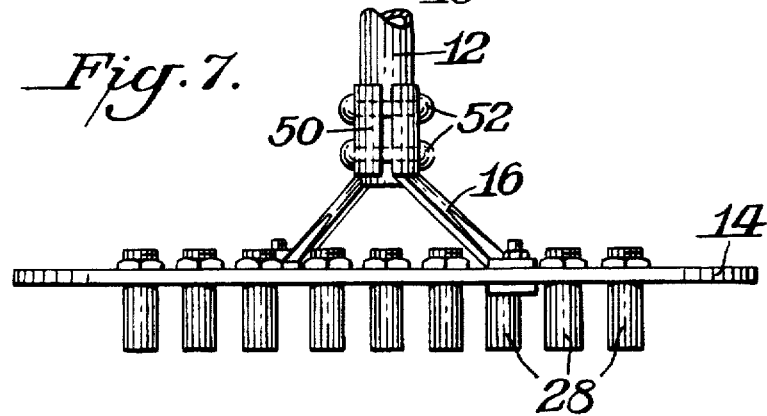
FIG. 7 is a side elevation view of the aerator showing the brackets connected to the handle by bolts.

As shown in FIG. 7, the brackets (16) may have a handle-contacting portion (50). The handle-contacting portion (50) may be secured to the handle (12) by a rivet (52). As shown in FIG. 8, the brackets (16) attached to the base plate (14) may be disposed radially from the handle (12).

As shown in FIG. 1, the base plate (14) may be flat. As shown in FIG. 10, the base plate (14) may also be arcuate.

Alternatively, as shown in FIG. 11, there may also be a first base plate (54) and a second base plate (56) which are arranged so that a plurality of tines (28) with a flange (58) at the earth-discharging end are situated between the first base plate and the second base plate so that the tines (28) fit into the second base plate. The first base plate (54) and the second base plate (56) are connected by a bracket (16) which has depending portion (60) contacting the upper surface of the first base plate and a further depending portion (62) contacting the lower surface of the second base plate and the depending portions are separated by a lip (64) that covers a portion of the sides of the upper and lower base plates. A bolt (24) passes through the portion (62) contacting the lower side of the second base plate (56), passes through the second base plate, passes through the first base plate (54), and passes through the portion (60) contacting the upper side of the first base plate. The bolt (24) is secured by a nut (26).

Alternatively, as shown in FIGS. 13 and 14, the brackets (16) may be connected to the handle (12) by opposing clamp plates (66).

Alternatively, as shown in FIG. 15, the base plate (14) may have a groove (68) in the lower surface of the base plate. The bracket (16) has a depending portion (34) contacting the upper surface of the base plate and a further depending portion (36) contacting the lower surface of the base plate so that it is situated in the groove (68) on the lower side of the base plate (14).

What is claimed is:

1. An aerator, which comprises:

a base plate with an upper and a lower surface;

a handle spaced apart from the base plate;

a bracket connected to the handle and connected to the base plate with a first portion of the bracket contacting the upper surface of the base plate and a second portion of the bracket contacting the lower surface of the base plate; and a plurality of hollow tines of generally circular cross section in at least one row attached to the base plate wherein each tine has an earth-piercing end and a discharge end such that the earth-piercing end is downwardly directed from the base plate and the discharge end is opposite the downwardly directed earth-piercing end and discharges earth on the upper surface of the base plate.

2. The aerator of claim 1, wherein the base plate is formed from a plastic material.

3. The aerator of claim 1, wherein the base plate is formed from metal.

4. The aerator of claim 1, wherein an inwardly directed annular projection is disposed on an interior surface of each tine.

5. The aerator of claim 4, wherein the inwardly directed annular projection is disposed on an interior surface of each tine near the earth-piercing end of each tine.

6. The aerator of claim 4, wherein the bracket connected to the base plate holds the handle at an angle measured from the vertical in the range of between 0° and about 15°.

7. The aerator of claim 6, wherein the angle is about 7°.

8. The aerator of claim 4, wherein the base plate is arcuate.

9. The aerator of claim 1, wherein the bracket connected to the base plate holds the handle at an angle measured from the vertical in the range of between 0° and about 15°.

10. The aerator of claim 9, wherein the angle is about 7°.

11. The aerator of claim 9, wherein the base plate is arcuate.

12. The aerator of claim 1, wherein the bracket is integrally formed at one end of the handle.

13. The aerator of claim 1, further comprising: an additional bracket connected to the handle, said additional bracket having a first portion contacting the upper surface of the base plate and a second portion contacting the lower surface of the base plate and wherein said bracket and said additional bracket are disposed radially from one end of the handle.

14. The aerator of claim 1, wherein the handle and the bracket are connected by opposing clamp plates.

15. The aerator of claim 1, wherein the base plate is arcuate.

16. The aerator of claim 1, wherein the tines are attached to the base plate in a plurality of rows.

17. The aerator of claim 16, wherein the tines of one row are offset from the tines in an adjacent row.

18. The aerator of claim 17, wherein the tines are offset such that the center point of each tine in a row is adjacent to a point that bisects the centerpoints of two adjacent tines.

19. The aerator of claim 16, wherein there are five rows of tines.

20. The aerator of claim 1, wherein the base plate has a groove in the lower surface of the base plate so that the second portion of the bracket contacts the base plate in the groove.

21. The aerator of claim 1, wherein the base plate is formed from a thermoplastic resin material.

22. An aerator, which comprises:

a base plate with an upper and a lower surface;

a handle spaced apart from the base plate;

a bracket connected to the handle and connected to the base plate with a first portion of the bracket contacting the upper surface of the base plate and a second portion of the bracket contacting the lower surface of the base plate; and a plurality of hollow tines of generally circular cross section attached to the base plate in spaced-apart relation wherein each tine has an earth-piercing end and a discharge end such that the earth-piercing end is downwardly directed from the base plate and the discharge end is opposite the downwardly directed earth-piercing end and discharges earth on the upper surface of the base plate.

23. The aerator of claim 22, wherein the tines are attached to the base plate in spaced-apart relation in a plurality of rows.

24. The aerator of claim 23, wherein the tines of one row are spaced apart and offset from the tines in an adjacent row.

25. The aerator of claim 24, wherein five rows of tines are attached to the base plate.

26. The aerator of claim 24, wherein the tines are offset such that the center point of each tine in a row is adjacent to a point that bisects the centerpoints of two adjacent tines.

27. The aerator of claim 22, wherein the tines are connected to the base plate with adhesive.

28. The aerator of claim 22, wherein the tines are connected to the base plate by heat fusing.

29. The aerator of claim 22, wherein screw threads are formed on an outer surface of the tines and the tines are screwed into the base plate.

30. The aerator of claim 22, wherein screw threads are formed on an outer surface of the tines and mating screw threads are formed in openings in the base plate and wherein each tine is threaded into one opening, optionally being held in place with a lock nut.

31. The aerator of claim 22, wherein the tines are welded to the base plate.

32. The aerator of claim 22, wherein the tines are press-fit into openings formed in the base plate.

33. The aerator of claim 22, wherein the base plate and tines are molded together.

34. An aerator which comprises:

a first base plate with an upper and a lower surface having a plurality of holes;

a second base plate with an upper and a lower surface having a plurality of holes aligned with the holes in the first base plate, said second base plate spaced apart from said first base plate;

a handle spaced apart from the first base plate;

a bracket connected to the handle and connected to the first and second base plates with a first portion of the bracket contacting the upper surface of the first base plate and a second portion of the bracket contacting the lower surface of the second base plate; and a plurality of hollow tines of generally circular cross section inserted within the holes of the second base plate and contacting the first base plate, wherein each tine has an earth-piercing end and a discharge end such that the earth-piercing end is downwardly directed from the second base plate and the discharge end is opposite the downwardly directed earth-piercing end and terminates adjacent to the upper surface of the second base plate such that earth discharged from the earth-discharging end of the tine is discharged on the upper surface of the first base plate.

35. The aerator of claim 34, wherein a flange projects from an outer surface of each tine and said flange contacts the lower surface of the first base plate and the upper surface of the second base plate.

36. The aerator of claim 35, wherein a bolt connector fastens together the first portion of the bracket, the first base plate, the second base plate and the second portion of the bracket to retain the flanges projecting from the tines between the first base plate and the second base plate.

37. The aerator of claim 34, wherein the discharge ends of the tines terminate adjacent to the lower surface of the first base plate.

* * * * *